United States Patent [19]

Bertolino

[11] 4,042,116
[45] Aug. 16, 1977

[54] TRACK LAYING TRACTOR WITH MOVABLE BOOM WHICH CAN BE TILTED LATERALLY

[75] Inventor: Giorgio M. Bertolino, Torinio, Italy

[73] Assignee: Fiat-Allis Construction Machinery, Inc., Deerfield, Ill.

[21] Appl. No.: 647,725

[22] Filed: Jan. 9, 1976

[30] Foreign Application Priority Data

Jan. 24, 1975  Italy .................................. 67163/75

[51] Int. Cl.$^2$ ............................................. B66C 23/72
[52] U.S. Cl. ................................. 212/140; 214/1 PA; 212/8 R; 212/8 B
[58] Field of Search .................. 212/8 R, 8 B, 48–49, 212/140–142; 214/1 PA, 142

[56] References Cited

U.S. PATENT DOCUMENTS

| 1,740,663 | 12/1929 | McManis ........................... 214/1 PA |
| 1,931,221 | 10/1933 | Cummings et al. .................. 212/8 B |
| 2,722,320 | 11/1955 | Dobeus et al. ....................... 212/8 B |
| 3,058,600 | 10/1962 | Leak et al. ............................ 212/8 B |
| 3,266,636 | 8/1966 | Dorn ..................................... 212/8 B |
| 3,426,915 | 2/1969 | Tesch .................................... 212/8 B |
| 3,945,518 | 3/1976 | Inoue .................................... 214/142 |

FOREIGN PATENT DOCUMENTS 208,133  10/1955  Australia ............................. 214/142

*Primary Examiner*—Albert J. Makay
*Assistant Examiner*—R. B. Johnson
*Attorney, Agent, or Firm*—August E. Roehrig, Jr.; Robert A. Brown; Harvey W. Rockwell

[57] ABSTRACT

A track laying tractor comprising a tractor body having a framework supported laterally by a pair of track units, a crane placed upon one of the sides of the tractor body and having a movable boom which can be tilted laterally and pivoted at the base on an appendage fixed to the outer face of the adjacent track unit. A counterweight for balancing the load is placed on the side of the tractor body opposite to the crane. An additional framework supports a mechanical linkage system for varying the lateral tilt of the crane, for adjusting the position of the counterweight and for lifting the load.

6 Claims, 7 Drawing Figures

TRACK LAYING TRACTOR WITH MOVABLE BOOM WHICH CAN BE TILTED LATERALLY

BACKGROUND OF THE INVENTION

This invention concerns track laying tractors of the type comprising a tractor body having a framework supported laterally by a pair of track units, a crane placed upon one of the sides of the tractor body and having a movable boom which can be tilted laterally and pivoted at the base on an appendage fixed to the outer face of the adjacent track unit, a counterweight for balancing the load, placed on the side of the tractor body opposite to the crame, and an additional framework which supports means for varying the lateral tilt of the crane, means for adjusting the position of the counterweight and means for lifting the load.

In tractors of this type there is the problem of making an additional framework which shall be capable of supporting the considerable stresses arising from maneuvering of the useful load and of the counterweight and that, at the same time, will itself have the smallest possible mass.

According to known methods, this additional framework consists of two arched structures each of which is arranged in correspondence with a track unit and curves round the upper portion of the said track unit so as to rest, on the inside, upon the supporting structure of the tractor, and on the outside, upon an appendage fixed to the outer side of the track frame.

This solution has the disadvantage that one section of each of the two arched structures projects laterally from the outer edge of the associated track unit. Since it is necessary to transport the tractor from one place to another, it is necessary, in certain cases in order to reduce the transverse dimension of the tractor, to dismantle the two arched structures, and, consequently, all the members which these support.

SUMMARY OF THE INVENTION

With a view to eliminating this disadvantage, this invention has as its object a tractor of the type described, having such an additional framework of a generally portal-shaped structure consisting of two pillars, supported by the support structure of the tractor body, and an upper cross-piece; the transverse dimension of the said portal-shaped structure being not greater than the distance between the outer ends of the two tracks.

DESCRIPTION OF THE DRAWINGS

The invention will now be described with reference to a preferred embodiment illustrated in the attached drawings, provided by way of non-restrictive example, in which.

DESCRIPTION OF A PREFERRED EMBODIMENT

Figure 1:
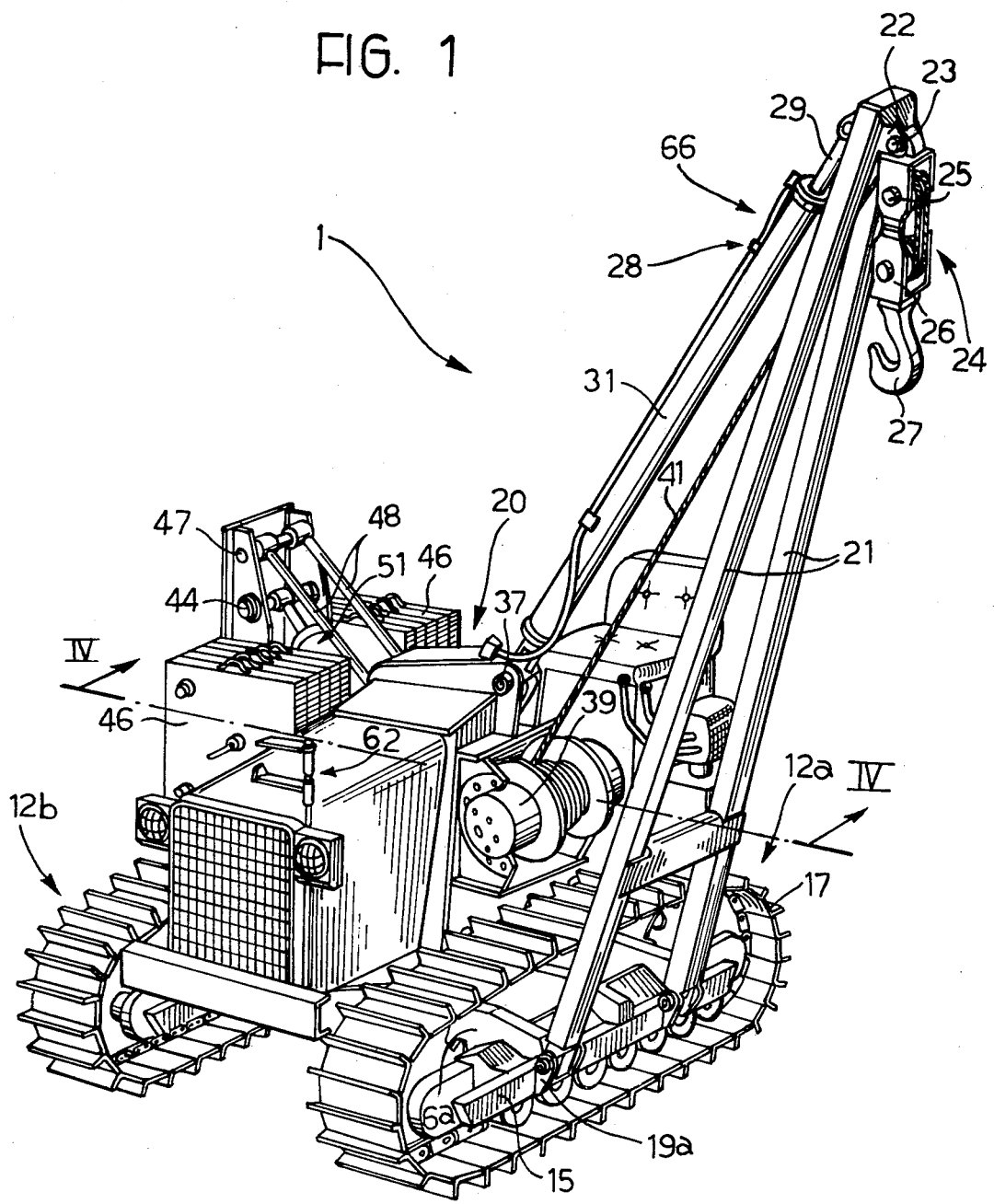
FIG. 1 is a perspective view of a tractor according to the invention.
Figure 2:
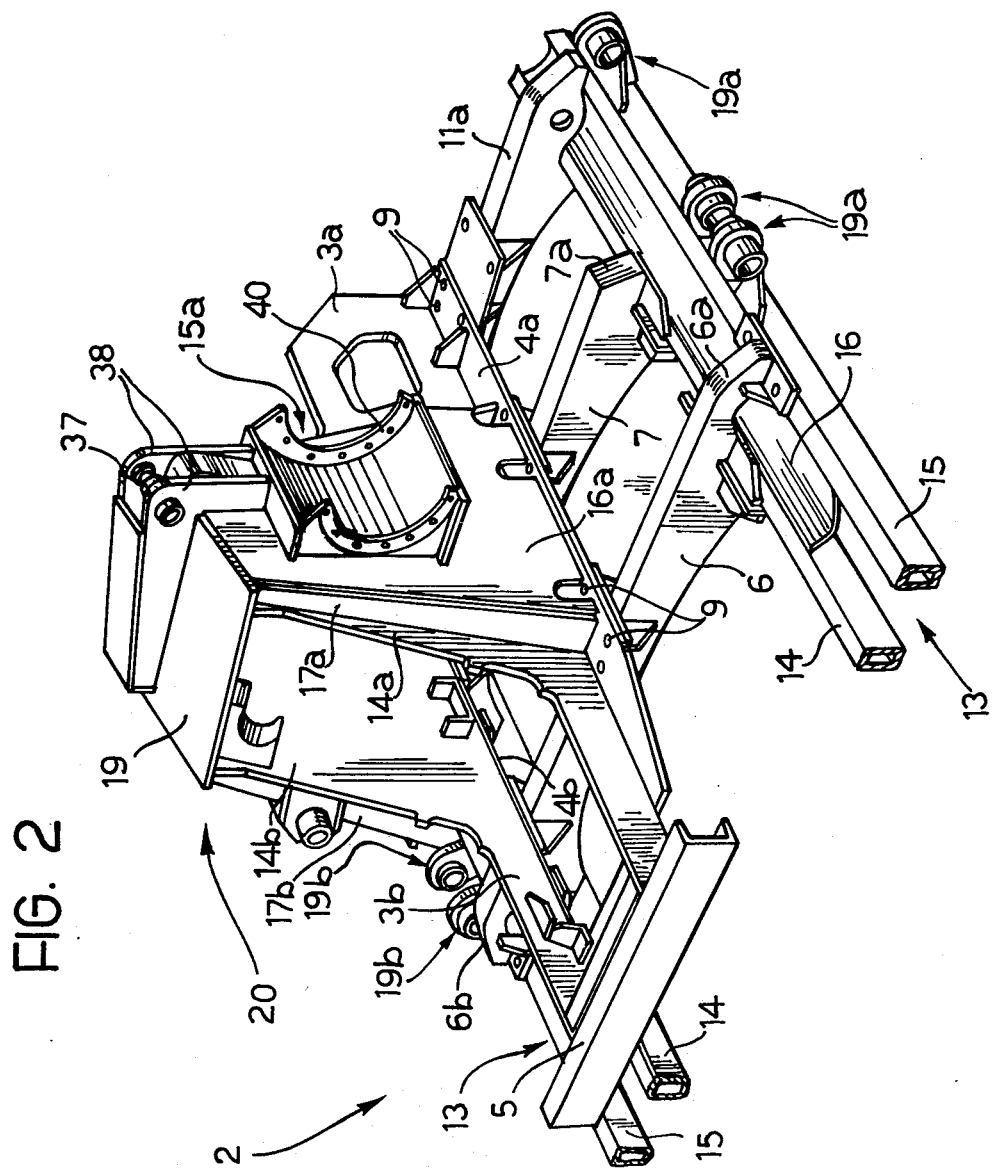
FIG. 2 is a perspective view of the portal-shaped framework for supporting the crane and counterweight.
Figure 3:
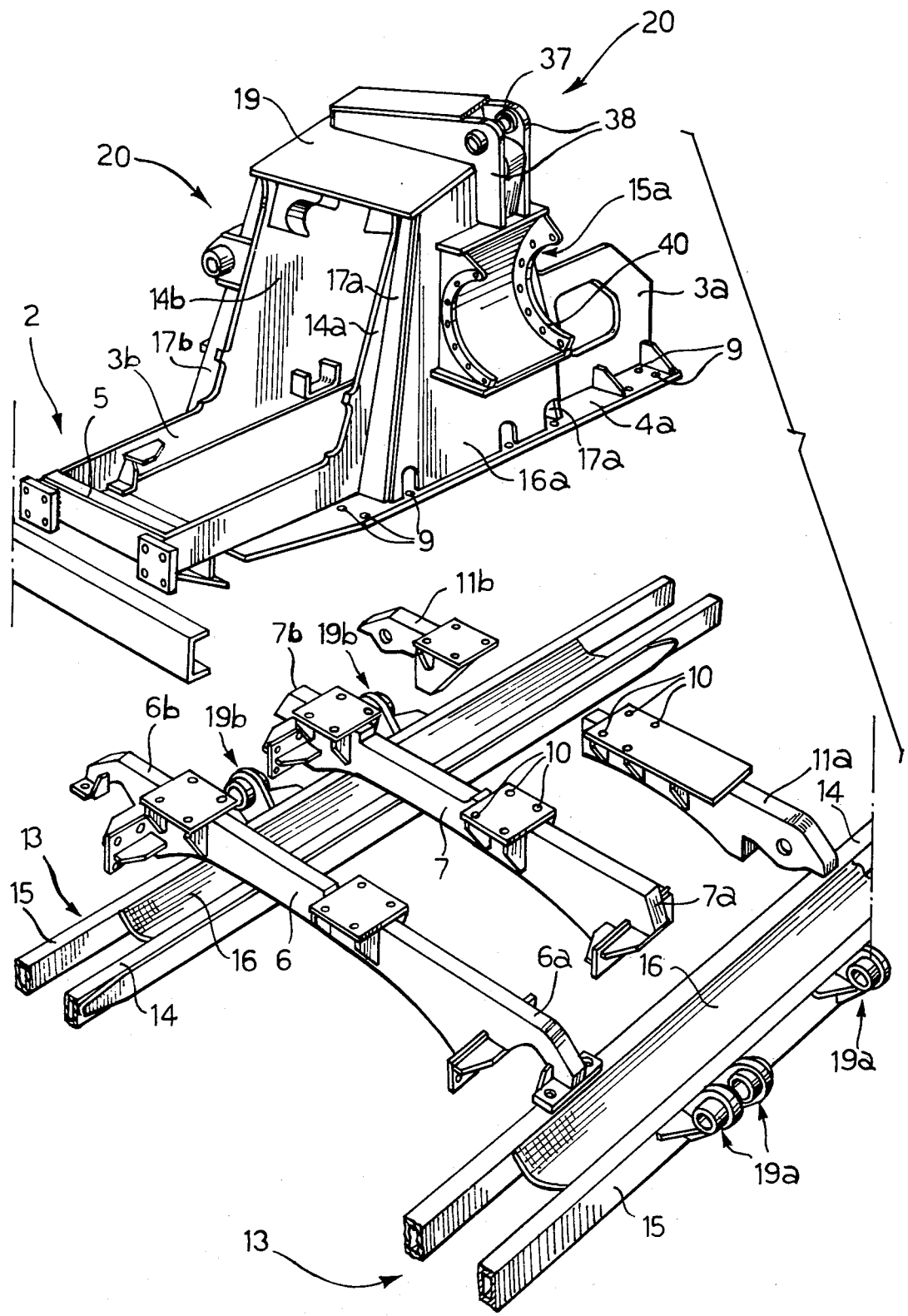
FIG. 3 is an exploded view of the apparatus shown in FIG. 2.

Referring now to FIGS. 1, 2, and 3, there is shown a tractor body 1 having a support structure 2. The structure 2 comprises two vertical elongated plates 3a and 3b, to the base of each of which there is affixed a horizontal plate 4a and 4b respectively, furnished with base holes 9. The plates 3a and 3b are arranged longitudinally facing each other and extending for substantially the whole length of the tractor body 1 and are connected by a fixed forward cross-piece 5 and by two dismantable cross-pieces 6 and 7. The ends 6a, 6b, and 7a, 7b, of the cross-pieces 6 and 7 extend outwards laterally to the vertical plates 3a, and 3b, in the form of cross arms.

To the lower face of the horizontal plates 4a and 4b there are also firmly connected, towards the rear, two elongated elements 11a, 11b, extending outwards in the form of additional transverse arms. The upper wall of each of the cross-pieces 6 and 7 and of each of the elongated elements 11a and 11b has a number of holes 10 located in positions aligned with the corresponding holes 9 of the horizontal plates 4a and 4b so as to receive connecting through bolts, not illustrated. On the two sides of the tractor body 1 there are arranged, facing the two vertical plates 3a and 3b, two track units 12a and 12b. Each track unit comprises a frame 13 having an inner section 14 and an outer section 15 placed longitudinally face to face and connected by a cross plate 16. The frame 13 supports, by known means, a number of rollers over which passes a track 17. The support structure 2 of the tractor body is supported laterally by the transverse arms 6a, 6b, 7a, 7b, 11a, 11b, the free end of each of which rests on the frame 13 of the corresponding track unit.

Figure 4:
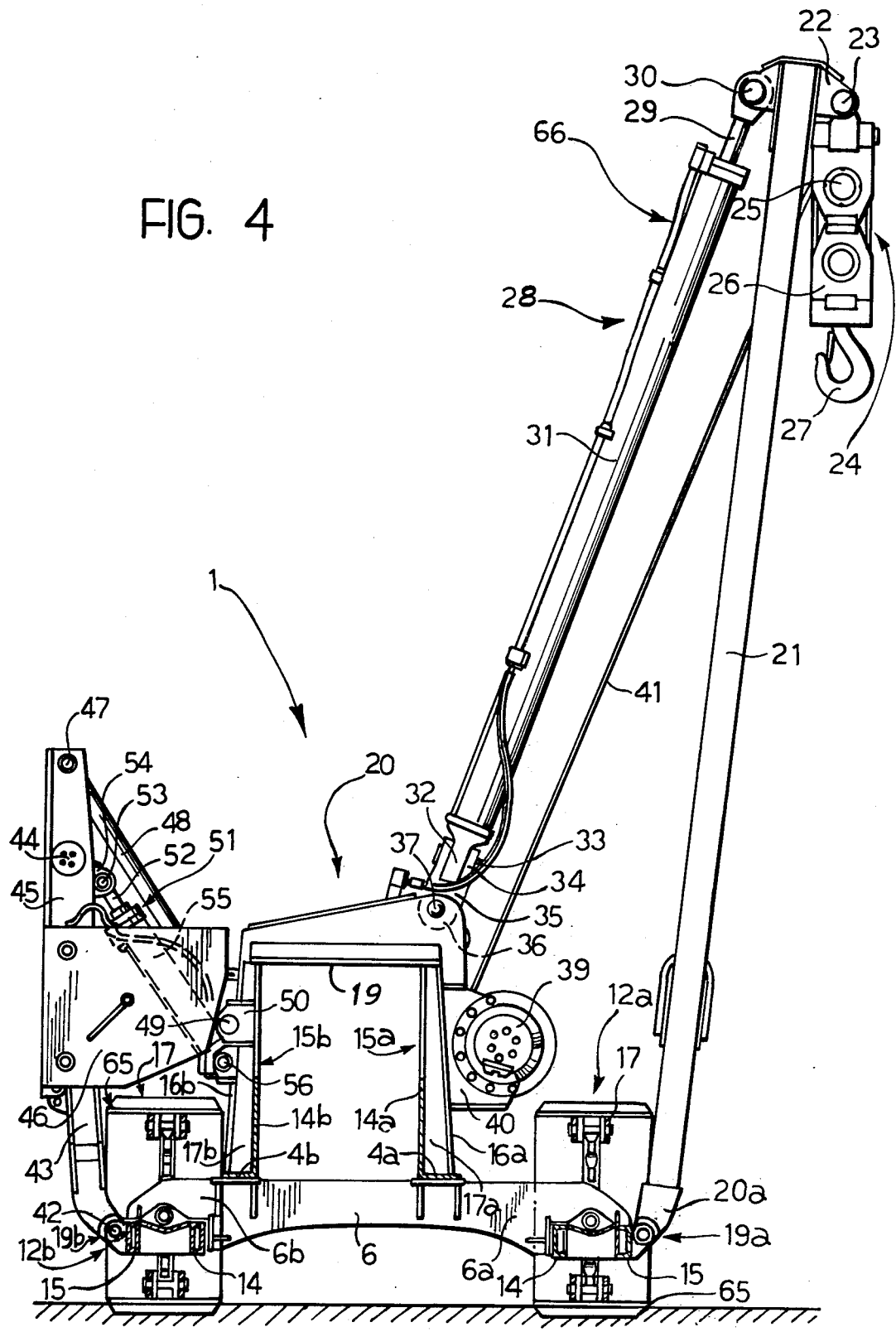
FIG. 4 is a diagrammatic section taken on the line IV—IV of FIG. 1.
Figure 5:
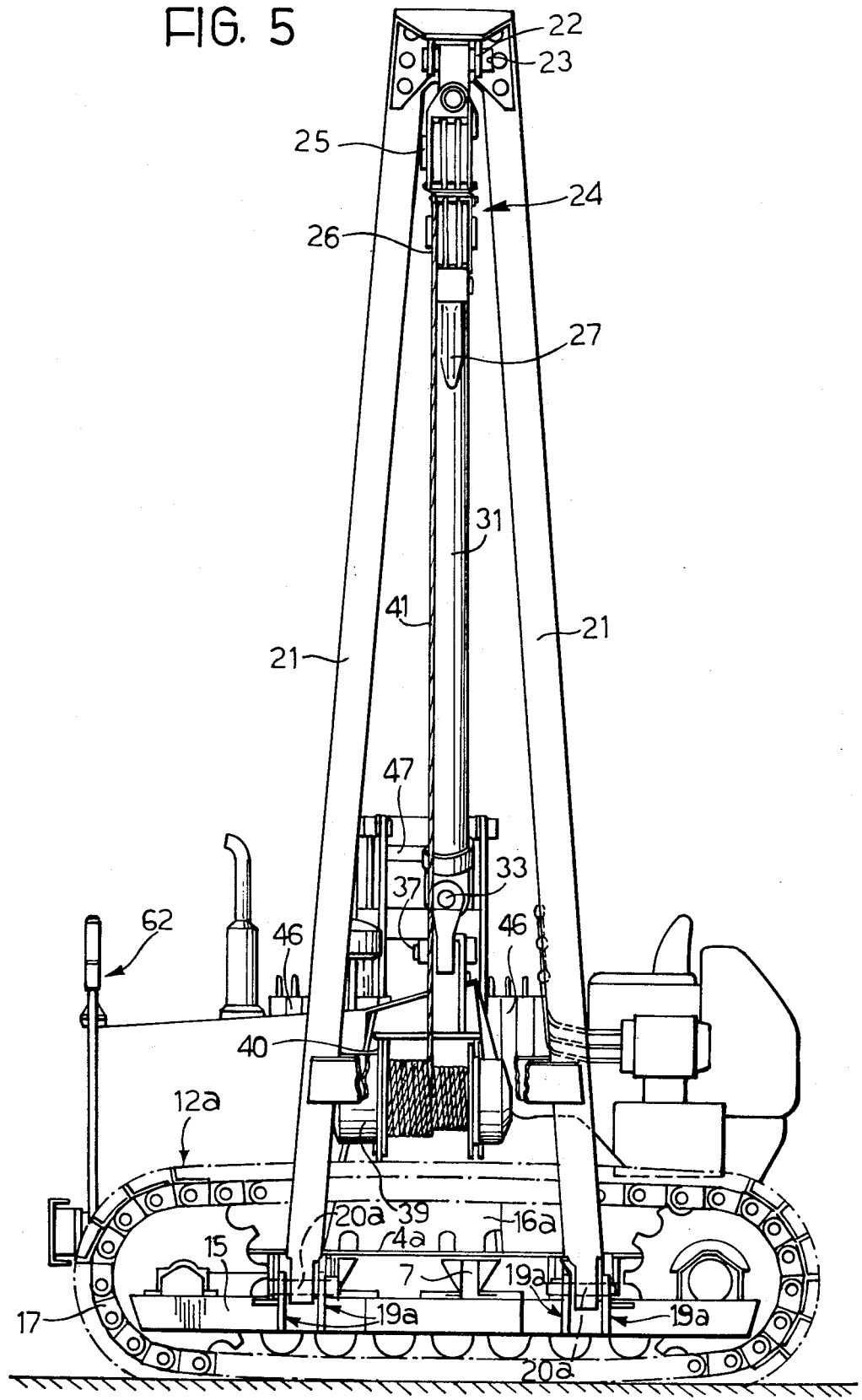
FIGS. 5 and 6 are the two opposite side views shown diagrammatically, of the tractor in FIG. 1.
Figure 6:
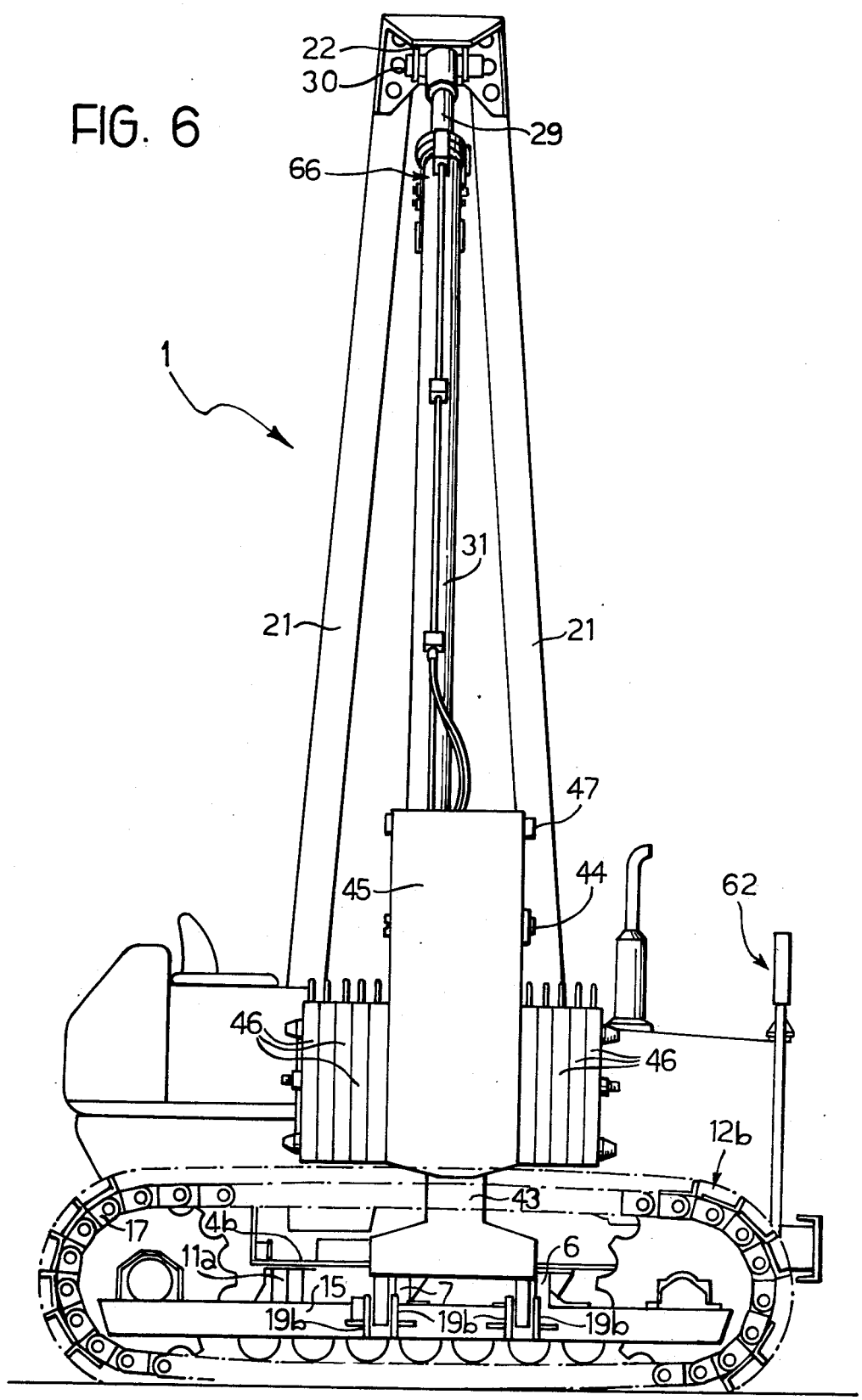

Each of the vertical plates 3a and 3b of the support structure 2 is provided, in an intermediate zone, with an appendage 14a and 14b respectively, extending upwards in the form of a vertical wall. Upon the outer surface of each of the appendages 14a and 14b there is fixed an upright, as best shown in FIG. 4, as 15a and 15b, respectively. Each of these uprights consists of a main plate 16a and 16b facing the corresponding appendage 14a, 14b and fixed to it by two lateral plates 17a and 17b respectively. A plate 19, in the form of a cross-piece, connects the two uprights 15a and 15b at the top. The cross-piece 19 and relative struts constitute an additional support framework, portal-shaped, shown in its entirety as 20. The track unit 12a has on its outer face two appendages 19a fixed to the outer section 15 of the corresponding frame 13. Each appendage 19a bears a pivot 20a on which is articulated the movable boom 21 of a crane 66, which can tilt laterally. To the upper end of the movable boom 21 there is affixed a plate 22 which supports, by means of an articulating pin 23, a pulley device 24. The device 24 consists of a fixed element 25 and a movable element 26 each provided with a number of pulleys. Fixed to the movable elements 26 is a hook 27 for supporting the load to be lifted. Maneuvering of the movable boom is controlled by a hydraulic jack 28, the rod 29 of which is articulated, at the outer end, on to a pin 30 fixed to the plate 22. The rod 29 slides in a cylinder 31 having at its base an appendage 32. The appendage 32, carries a pin 33 positioned transversely of the longitudinal axis of the tractor. On to the pin 33 is articulated a fork-shaped end 34 of a plate 35, the opposite end 36 of which is articulated on to a pin 37 extending longitudinally. The pin 37 is borne by two ridges 38 fixed to the upper area of the portal structure 20. A winch 39, supported by a cradle form framework 40 fixed to the main plate 16a of the upright 15a, controls, by means of a cable 41, raising of the hook 27.

As best shown in FIGS. 1 and 4, on the side of the tractor opposite to the crane 66 the track unit 12b has, on its outer face, two appendages 19b fixed to the section 15 of its frame 13. Each appendage 19b has a pin 42 onto which there is articulated one end of a rocker arm 43 the opposite end of which is articulated, by means of a pin 44, to a structure 45 fixed to a loading balancing counterweight 46. To the structure 45 there is also articulated, by a pin 47, one end of another rocker arm 48, the opposite end of which is articulated by means of a pin 49, to a structure 50 fixed to the facing upright 15b of the portal-shaped support framework or structure 20. The position of the counterweight 46 can be changed by a hydraulic jack 51, the rod 42 of which is hinged at its outer end by a pin 53, borne by an appendage 54 of the rocker arm 43. The rod 52 slides in a cylinder 55 which is articulated at the base of a pin 56 borne by a structure fixed to the main plate 16b of the portal structure 40.

For transport of the tractor it is sufficient to dismantle the movable boom 21 and the counterweight 46 with its relative structure 45, the said dismantling being effected by taking out the pins 20a, 23, 30 and respectively, the pins 42, 53 and 49. The jack 28 is rotated forward around the pin 33 and rests upon a support fork 62 fixed to the front of the tractor body. All the other members relative to the movement of the crane 66 and the counterweight 46 can be transported together with the tractor without any further dismantling operations being undertaken. In this way the transverse dimension of the tractor will be the distance between the outer edges 65 of the tracks 17 of the two track units 12a and 12b.

Figure 7:
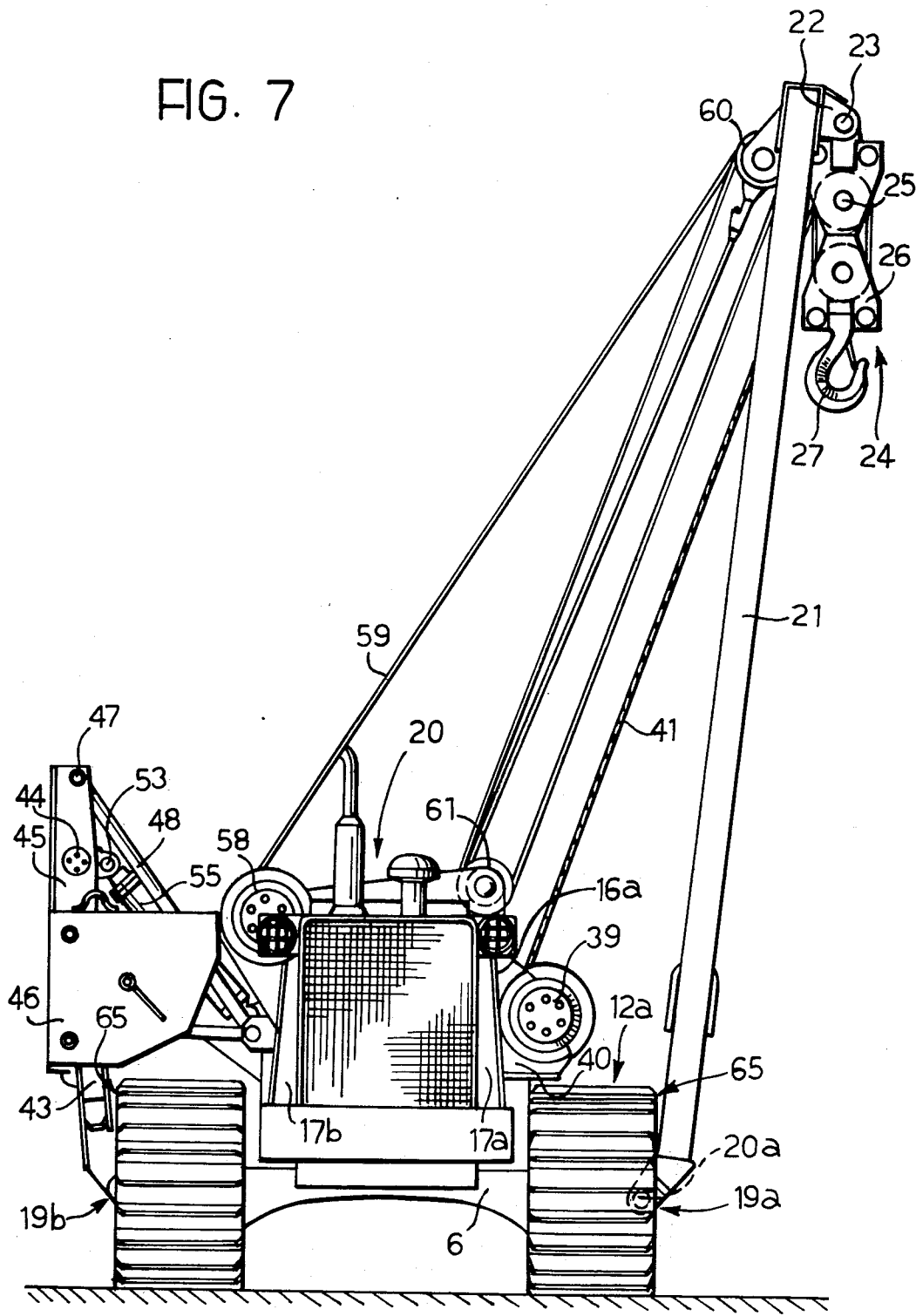
FIG. 7 is a front view of FIG. 1, with an alternative crane actuating mechanism.

In the variant illustrated in FIG. 7 the lifting means of the movable boom 21 of the crane 66 consist of a winch 58 as well as of a jack as described in the example in FIGS. 1 to 6. The winch 58 is also supported by the upper part of the portal structure 20 but is now placed on that side of the structure opposite to the crane 66 and it controls raising of the movable boom 21 by means of a cable 59 wound upon pulleys 60 borne by the said movable boom and upon return pulleys 61 borne by the portal-shaped support structure 20.

In the examples described the additional portal-shaped support structure 20 is made by welding the appendages 14a and 14b of the vertical plates 3a and 3b to the uprights 15a and 15b to the cross-piece 19. Naturally this support structure 20 could be made also by casting or made separately and afterwards fixed by bolts, the fact remaining that the transverse dimension of the said structure will not exceed the distance between the outer edges 65 of the aforesaid two tracks.

While the invention has been described with reference to a preferred embodiment, it will be understood by those skilled in the art that various changes may be made and equivalents may be substituted for elements thereof without departing from the scope of the invention. In addition, many modification may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. In a crawler tractor including a tractor body supported by a pair of track laying units which comprise a track support frame about which the tracks pass in an endless path of movement, a load lifting crane mechanism having a movable boom supported on one side of the tractor body at the outer side of the adjacent track unit and a pulley device for lifting or moving loads, a variably positionable load balancing counterweight mechanism supported from the tractor body on the side opposite the crane mechanism for balancing the load connected to the crane mechanism, the improvement comprising base support means extending transversely between and carried by the track support frame on each track unit for connecting the crane and counterweight mechanism to the tractor body, each said track support frame carrying pivot means on an outer side thereof positioned within the area defined by the path of movement of the tracks moving endlessly thereabout, one of said pivot means detachably securing a first portion of the crane mechanism to one track support frame for lateral movement relative thereto, and the other of said pivot means removably securing a portion of the counterweight mechanism to the other track support frame for lateral movement relative thereto, a support frame secured to and extending upwardly from said base support means for pivotally connecting, on opposite sides thereof, a second portion of the crane mechanism and another portion of the counterweight mechanism for lateral movement relative thereto, means for pivotally moving said crane and counterweight mechanism laterally of said track support frame when pivotably connected thereto to balance the crawler tractor during load lifting operation, and means for pivoting said second portion of said crane mechanism longitudinally of said track support frames from a first position in which said first and second portions of said crane mechanism are connected for load lifting operation to a second position in which said first and second portions of said crane mechanism are disconnected when said pivot means securing said crane mechanism to the track support frame is detached to facilitate transporting the tractor by limiting the width thereof to the outer edges of the tracks.

2. The apparatus of claim 1 wherein said support frame includes spaced parallel plates extending upwardly from said base support means and joined together at an upper edge thereof by a cross-piece to form a portal-shaped framework, not extending beyond the outer edges of the tracks, said pivotal connection for a portion of the counterweight mechanism being secured to one of said spaced parallel plates, and said pivotal connection for a portion of the crane mechanism being secured to said cross-piece and another one of said spaced parallel plates.

3. The apparatus of claim 2 wherein said parallel plate securing said pivotal connection for a portion of the crane mechanism also includes means for actuating said pulley device secured thereto.

4. The apparatus of claim 1 wherein said means for pivotally moving said crane and counterweight mechanisms laterally of said track support frames comprises
- a hydraulic jack pivotally secured to said support frame at one end and to the movable boom at the other, and
- a hydraulic jack pivotally secured to said support frame at one end on a side opposite to the boom and pivotally secured to the counterweight mechanism at the other.

5. The apparatus of claim 1 wherein said pivot means carried by each track support frame comprises spaced enclosed bearing surfaces and a connecting pin extending therebetween for engaging said bearing surfaces to removably secure a portion of the counterweight or crane mechanism thereto.

6. The apparatus of claim 1 further including means for supporting said second portion of said crane mechanism in said second position.

* * * * *

UNITED STATES PATENT OFFICE
CERTIFICATE OF CORRECTION

Patent No. 4,042,116          Dated August 16, 1977

Inventor(s) Giorgio M. Bertolino, Torino, ITALY

It is certified that error appears in the above-identified patent and that said Letters Patent are hereby corrected as shown below:

On the title page, assignee line, delete "Fiat-Allis Construction Machinery, Inc." and insert --Fiat-Allis Macchine Movimento Terra, S.p.A.-- therefor.

Signed and Sealed this

Twenty-ninth Day of November 1977

[SEAL]

Attest:

RUTH C. MASON          LUTRELLE F. PARKER
*Attesting Officer*      *Acting Commissioner of Patents and Trademarks*